H. A. PALMER.
DETACHABLE CASTER FOR METAL BEDSTEADS.
APPLICATION FILED JAN. 28, 1909.
918,081.
Patented Apr. 13, 1909.
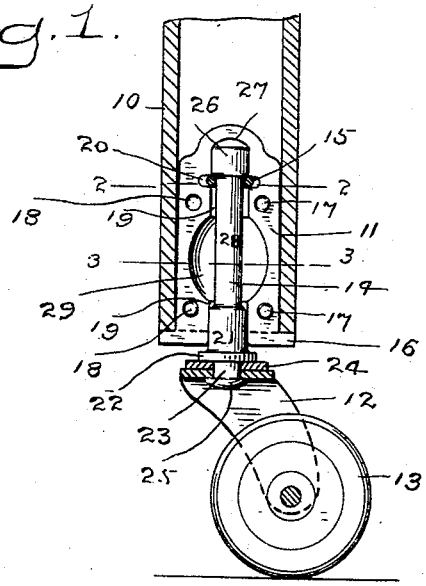
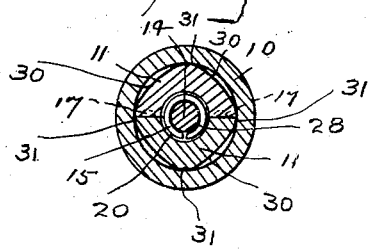
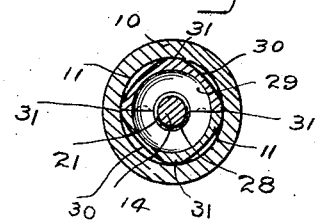
Witnesses:
H. A. Lamb
S. W. Atherton
Inventor
Harry A. Palmer
By Attorney
A. M. Wooster

UNITED STATES PATENT OFFICE.

HARRY A. PALMER, OF MERIDEN, CONNECTICUT, ASSIGNOR TO FOSTER, MERRIAM AND COMPANY, OF MERIDEN, CONNECTICUT, A CORPORATION OF CONNECTICUT.

DETACHABLE CASTER FOR METAL BEDSTEADS.

No. 918,081.  Specification of Letters Patent.  Patented April 13, 1909.

Application filed January 28, 1909. Serial No. 474,696.

*To all whom it may concern:*

Be it known that I, HARRY A. PALMER, a citizen of the United States, residing at Meriden, county of New Haven, State of Connecticut, have invented a new and useful Detachable Caster for Metal Bedsteads, of which the following is a specification.

This invention has for its object to provide a detachable caster for metal bedsteads which shall be simple and inexpensive to produce, practically indestructible and which will turn freely in use. It has been a serious objection to casters of this type heretofore produced and especially to sheet metal casters that they quickly twist out of shape so that the pintles will not turn in the sockets and the casters are thus rendered worse than useless as they tear carpets and rugs and ruin hardwood floors.

My present invention enables me to produce a relatively high grade caster at a very low price, that will remain firmly in place in the leg, will stand up for practically an unlimited length of time under the roughest kind of hard usage and will still turn freely and not injure carpets, rugs or hardwood floors.

With these and other objects in view I have devised the simple and novel caster which I will now describe, referring to the accompanying drawing forming a part of this specification and using reference characters to indicate the several parts:

Figure 1 is a view showing my novel caster in position in the leg of a metal bedstead, the leg and horn of the caster being in section and the wheel, pintle and one of the halves of the socket in elevation; Fig. 2 a section on the line 2—2 in Fig. 1; and Fig. 3 is a section on the line 3—3 in Fig. 1.

10 denotes the leg of a metal bedstead which is simply a metal tube, 11 the socket members, 12 the horn of the caster, 13 the wheel, 14 the pintle and 15 the spring retaining ring. The socket of each caster comprises two members which are cast from iron or any other suitable metal or alloy. These socket members are interchangeable and any two of them match together to form a socket which is made of just sufficient size to pass into the leg with a drive fit and be self-retaining in place. Each member is provided at its lower end with a semi-circular flange 16 of even diameter with the external diameter of the leg so as to form a finish for the bottom of the leg and prevent the socket from being driven into the leg in use. The members are provided on one side of their faces with bosses 17 and on the other side with recesses 18, the bosses upon one socket member engaging the recesses of the other socket member so as to lock the members to each other when driven into the leg.

In order to make the sockets rigidly self-retaining in place and to adapt them to slight variations in the internal diameter of the legs, I preferably make the members slightly tapering from bottom to top and also flatten the sides slightly, as at 30, leaving projecting longitudinal ridges 31, four in the present instance, two of which are at the meeting edges of the members and the other two on the backs of the members. These ridges engage the inner wall of the leg with a drive fit and in practice cut slight grooves therein so as to lock the socket in place and make it perfectly rigid with the leg. Each socket member is provided in its face with a semi-circular longitudinal groove, the two grooves in a socket forming a hole 19 to receive the pintle. Each socket member is also provided in its face with a curved depression, the two depressions in a socket forming a circular seat 20 which receives the spring ring 15, the purpose of which will presently be explained. I have shown the socket members as recessed out as at 29. This is simply to make the members lighter without impairing their strength.

The wheel may be of any suitable material as wood, glass or metal, or metal covered with felt or rubber. The horn is of ordinary construction and may be either made of sheet metal or cast. The pintle is provided with a bearing 21 which engages the lower end of hole 19 in the socket, fitting closely therein but turning freely. Below this bearing is a flange 22 and below the flange a stud 23 which passes through a strengthening washer 24 and through the horn between the arms thereof and is headed down against the horn as at 25, the horn and washer being locked tightly between the heading and flange 22. At the upper end of the pintle is a head 26 which fits closely in the upper end of hole 19 but turns freely therein, the entire weight resting on the head upon which the socket has a bearing as at 27. Between bearing 21 and the head the diameter of the pintle is preferably reduced as at 28. Ring 15 lies in seat 20 and grips the reduced portion of the pintle, in the assembled position, just under the head, thereby retaining the pintle in the socket and connecting the horn and wheel to the leg.

In attaching, the ring is laid in the seat and two socket members are matched together to form a complete socket which is driven into the leg. The pintle is then inserted in hole 19, the head of the pintle being forced through ring 15 in passing to its place, the ring expanding outward when the pintle is forced through it and then contracting under the head securing the pintle in place but leaving it free to be removed by sufficient pull upon the horn to draw the head outward through the ring, which remains in the seat.

Having thus described my invention I claim:

1. A caster comprising a socket adapted to be driven into a metal leg and consisting of corresponding members and having a longitudinal hole and a circular seat, a spring ring in said seat and a pintle adapted to be forced through the ring whereby it is detachably secured in the socket.

2. A caster comprising a socket adapted to be driven into a metal leg and consisting of members having corresponding bosses and recesses, said socket being provided with a longitudinal hole and a circular seat, a spring ring in said seat, and a pintle having a head adapted to be forced through the spring ring, for the purpose set forth, and supporting the weight by end engagement with the socket.

3. A caster comprising a socket adapted to be driven into a metal leg and consisting of corresponding members provided with means for locking them together when in the leg, a flange engaging the lower end of the leg, a longitudinal hole and a circular seat, a spring ring in said seat and a pintle having a head adapted to be passed through the ring, for the purpose set forth, and upon which the socket has its bearing.

4. A caster socket comprising members having corresponding bosses and recesses, a longitudinal hole and a circular seat, said members being provided with longitudinal ridges adapted to cut slight grooves in a metal leg, substantially as described, for the purpose specified.

5. A caster comprising a socket adapted to be driven into a metal leg and consisting of members having corresponding bosses and recesses, semi-circular flanges and longitudinal ridges, for the purpose set forth, said socket being provided with a longitudinal hole and a circular seat, a spring ring in said seat and a pintle having a head adapted to be forced through the spring ring whereby it is detachably retained in place.

In testimony whereof I affix my signature, in presence of two witnesses.

HARRY A. PALMER.

Witnesses:
  GEO. A. CANNON,
  CHAS. S. WILCOX.